(12) United States Patent
Shkunov et al.

(10) Patent No.: US 8,606,062 B2
(45) Date of Patent: Dec. 10, 2013

(54) APPARATUS AND METHOD FOR MODE CONTROL IN A SEMI-GUIDING AMPLIFIER MEDIUM

(75) Inventors: Vladimir V. Shkunov, Torrance, CA (US); David A. Rockwell, Culver City, CA (US); Robin A. Reeder, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/616,758

(22) Filed: Sep. 14, 2012

(65) Prior Publication Data

US 2013/0011109 A1    Jan. 10, 2013

Related U.S. Application Data

(63) Continuation of application No. 12/358,983, filed on Jan. 23, 2009.

(51) Int. Cl.
*G02B 6/02* (2006.01)

(52) U.S. Cl.
USPC ............................................. 385/123

(58) Field of Classification Search
USPC ............................................. 385/123
See application file for complete search history.

(56) References Cited

U.S. PATENT DOCUMENTS

| | | | |
|---|---|---|---|
| 4,185,890 A * | 1/1980 | Onoda et al. | 385/127 |
| 4,465,336 A | 8/1984 | Huber et al. | |
| 4,848,881 A | 7/1989 | Kahan et al. | |
| 5,046,809 A | 9/1991 | Stein | |
| 5,386,427 A | 1/1995 | Zayhowski | |
| 5,646,773 A | 7/1997 | Injeyan et al. | |
| 5,828,802 A * | 10/1998 | Stolen et al. | 385/27 |
| 5,864,644 A | 1/1999 | DiGiovanni et al. | |
| 5,909,529 A | 6/1999 | Bhagavatula | |
| 5,930,433 A | 7/1999 | Williamson et al. | |

(Continued)

FOREIGN PATENT DOCUMENTS

EP    1059707 A2 * 12/2000

OTHER PUBLICATIONS

Arkwright et al.; "Experimental and Theoretical Analysis of the Resonant Nonlinearity in Ytterbium-Doped Fiber"; Journal of Lightwave Technology; 16(5):798-806 (1998).

(Continued)

*Primary Examiner* — Uyen Chau N Le
*Assistant Examiner* — Hoang Tran
(74) *Attorney, Agent, or Firm* — Pierce Atwood LLP; Joseph M. Maraia (57) ABSTRACT

In various examples, a semi-guiding optical fiber includes a core having a high aspect ratio including first and second wide surface interfaces, and first and second narrow edge interfaces. The core has a slow axis parallel to the first and second wide surface interfaces, and a refractive index. The fiber also includes first and second signal claddings positioned in contact with the first and second wide surfaces of the core, respectively. The first and second signal claddings have a spatial refractive index profile having: i) a minimum value at a longitudinal axis of the core, ii) a maximum value substantially equal to the refractive index of the core at the first and second narrow edge interfaces of the core, and iii) intermediate values gradually increasing from the minimum value to the maximum value as distance from the longitudinal axis increases along the slow axis of the fiber.

14 Claims, 10 Drawing Sheets

(56) References Cited

U.S. PATENT DOCUMENTS

| | | | |
|---|---|---|---|
| 6,014,391 | A | 1/2000 | Byren |
| 6,229,939 | B1 | 5/2001 | Komine |
| 6,317,548 | B1 | 11/2001 | Rockwell et al. |
| 6,400,871 | B1 | 6/2002 | Minden |
| 6,477,295 | B1 | 11/2002 | Lang et al. |
| 6,529,318 | B1 | 3/2003 | Kaneda et al. |
| 6,888,859 | B2 | 5/2005 | Weber et al. |
| 7,164,818 | B2 | 1/2007 | Bryan et al. |
| 2007/0237453 | A1* | 10/2007 | Nielsen et al. .............. 385/28 |
| 2009/0041061 | A1 | 2/2009 | Shkunov et al. |

OTHER PUBLICATIONS

Bass et al.; "Axial Gradient Lenses"; Handbook of Optics—Devices, Measurements, and Properties [McGraw-Hill, Inc., NY]; 11:9.5 (1995).

Bass et al.; "Optical Elements"; Handbook of Optics—Devices, Measurements, and Properties [McGraw-Hill, Inc., NY]; 11:6.22 (1995).

Betin et al.; "200 W Phase-Conjugate Mirror for CW Radiation"; Optics Communications; 6 Pages (2008).

Born et al.; "The Refracting Telescope"; Principles of Optics, Electromagnetic Theory of Propagation, Interference and Diffraction of Light [Cambridge University Press, Seventh (Expanded) Edition]; Chapter 6.3:267-268 (1968).

Dong et al.; "Leakage Channel Optical Fibers with Large Effective Area"; Optical Society of America; 24 (8):1689-1697 (2007).

Galvanauskas et al.; "Effectively-Single-Mode Large Core Passive and Active Fibers with Chirally-Coupled-Core Structures"; CMB1—Conference on Lasers and Electro-Optics ; Technical Digest—Optical Society of America; 2 Pages (2008).

Hecht; "Optical Systems"; Optics—Fourth Edition, Pearson Education, Singapore; Chapter 5.7:209 (2004).

International Search Report and Written Opinion mailed Mar. 25, 2010 of PCT/US2010/021637 filed Jan. 21, 2010; 16 Pages.

Koechner; "Thermo-Optic Effects and Heat Removal"; Optical Sciences—Solid State Laser Engineering [Fifth Edition, Springer-Verlag, NY]; Chapter 7:406-468 (2000).

Koplow et al.; "Single-Mode Operation of a Coiled Multimode Fiber Amplifier"; Optics Letters.; 25(7):442-444 (2000).

Marciante; "Gain Filtering for Single-Spatial-Mode Operation of Large-Mode-Area Fiber Amplifiers"; JTuA86—Conference on Lasers and Electro-Optics; Technical Digest—Optical Society of America; 2 Pages (2007).

Neumann; "Wave Beam Guided by a Straight Single-Mode Fiber"; Single-Mode Fibers Fundamentals [Springer-Verlag, NY]; Chapter 2.2-2.4:12-16 (1988).

Neumann; "The Fundamental Fiber Mode"; Single-Mode Fibers Fundamentals [Springer-Verlag, NY]; Chapter 5:61-141 (1988).

Oh et al.; "Increased Pulsed Amplifier Efficiency by Manipulating the Fiber Dopant Distribution"; CTuQ3—Conference on Lasers and Electro-Optics; Technical Digest—Optical Society of America; 2 Pages (2006).

Ramachandran et al.; "Scaling to Ultra-Large-Aeff Using Higher-Order-Mode Fibers"; CThAA2—Conference on Lasers and Electro-Optics; Technical Digest—Optical Society of America; 2 Pages (2006).

Siegman; "Propagating Modes in Gain-Guided Optical Fibers"; Optical Society of America; 20(8):1617-1628 (2003).

Snyder et al.; "Step-Profile Waveguides"; Optical Waveguide Theory [Kluwer Academic Publishers, Boston, MA]; Chapter 12:239-248 (2000).

Tamir; "Waveguide Horns"; Guided-Wave Optoelectronics [Springer-Verlag, Berlin]; Chapter 3.5:125-134 (1988).

Taverner et al.; "158-uJ Pulses from a Single-Transverse-Mode, Large-Mode-Area Erbium-Doped Fiber Amplifier"; Optics Letters; 22(6):378-380 (1997).

Witkowska et al.; "All-Fiber Anamorphic Core-Shape Transitions"; Optics Letters; 31(18):2672-2674 (2006).

\* cited by examiner

FIG. 12
BACKGROUND

APPARATUS AND METHOD FOR MODE CONTROL IN A SEMI-GUIDING AMPLIFIER MEDIUM

RELATED APPLICATION

This application is a continuation of U.S. application Ser. No. 12/358,983 filed Jan. 23, 2009. The entire teachings of the above application is incorporated herein by reference.

BACKGROUND

The present disclosure pertains to an apparatus and a method for controlling modes in a semi-guiding amplifier medium.

Fiber lasers can be used in many applications and are increasingly sought after in certain applications as substitutes to solid state lasers. Fiber lasers are more compact, reliable have high efficiency, and can provide robust single-mode output. In addition, fiber lasers can be used in an all-fiber architecture without free-space optics and hence may not require a rigid optical bench. Over the past decade, output powers of fiber lasers have been increased several orders of magnitude, from the watt-level to multi-kW powers, making fiber lasers competitive with solid state based lasers.

One of the challenges inherent in scaling the fiber laser output power is selecting lower order modes from a plurality of modes in the fiber laser and substantially reducing or eliminating higher order modes to ensure stable high beam-quality output. If higher modes are allowed to compete for the available pump power of the laser, the higher modes in the laser can be amplified and significantly degrade the output beam quality and may reduce the lasing efficiency.

In conventional fiber laser systems, mode control is generally accomplished by providing a core of fiber laser that causes higher order modes to radiate out into the cladding of the fiber laser. For example, for large mode area (LMA) fiber lasers, a mode-dependent loss may be created by forming the fiber laser into a coil with a predetermined bend radius. Coiling imposes radiation losses that are highly dependent on mode order. The loss rate increases rapidly with increasing mode order. Hence, using a proper coiling radius the higher-order modes can be stripped out leaving only the lower-order modes. Alternatively, a secondary core can be wound as a helix around the primary core of the fiber laser at a predetermined pitch and distance from the primary core of the fiber laser. In this case, the secondary core wound as a helix around the primary core can draw out the higher-order modes. However, these types of mode control may be impractical for fiber lasers having a relatively large diameter core (i.e., a diameter exceeding 50 µm) since mode discrimination becomes inadequate between the increased number of competing modes and the diminishing separation in loss rates between neighboring modes to reliably select the lowest-order mode while operating at a low transmission loss.

Another conventional approach in controlling modes in a fiber laser is the use of higher order mode (HOM) fiber lasers. HOM fibers have a large numerical aperture NA. In HOM fibers, the circular core (e.g., with a diameter approaching and even exceeding 100 µm) is multimode and a signal beam can propagate through the fiber as a single but higher-order linearly polarized ($LP_{1m}$) mode. The higher mode is preferred in this case because of its large effective area and its strong immunity to fiber bends. Special couplers that convert between the lower-order modes and the preferred higher-order mode are employed at each end of the HOM fiber. However, in these types of fiber lasers, power scalability is limited by the need of a narrow core LMA-based output coupler to convert the higher order mode to a conventional high quality $LP_{01}$ output beam, and limited by optical coupling between different LP modes due thermal gradient arising inside the core of the fiber laser.

Another conventional approach in controlling modes in a fiber laser is by employing gain guiding. Gain guiding occurs when the active core is surrounded by a cladding having either an equal or slightly higher refractive index to make the core anti-guiding. In this case, all the modes for the core are lossy due to the anti-guiding effect that pulls the modes into the cladding. However, if the core is optically pumped to provide gain, the lower-order mode gravitates to, or tends to concentrate within, the active region and can be optically trapped by the gain region itself. However, gain guiding is extremely sensitive to fiber bends and can be highly susceptible to small refractive-index variations. As a result, gain-guided fiber lasers cannot be coiled. Gain guided fiber lasers are also highly sensitive to very small index inhomogeneities, and the fact that the mode size depends on the gain adds to the complexity of this approach.

Another conventional approach in controlling modes in fiber lasers is by employing gain filtering. Gain filtering has been utilized in index-guided round core fiber lasers. In this case, a compact gain region is provided and is localized to a fraction (approximately 50%) of the core diameter which allows the lowest-order mode to have higher gain due to the greater overlap of the lowest-order mode with the compact gain region. However, gain saturation limits the effectiveness of gain filtering to about 5 to 10 modes for a typical gain of about 100.

Figure 12:
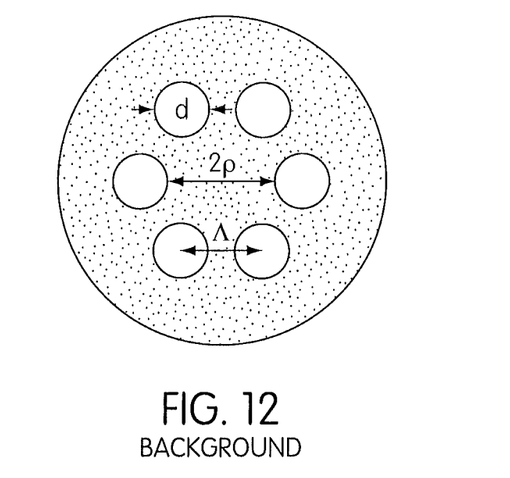
FIG. 12 is a schematic diagram of a cross-section of a conventional leakage channel fiber (LCF).

Yet another conventional approach in controlling modes in fiber lasers is to use a leakage channel fiber (LCF). FIG. 12 depicts schematically a cross-section of a leakage channel fiber. Fibers typically guide the signal in the core by surrounding the core with a continuous cladding material having a refractive index slightly lower than that of the core. In the LCF architecture shown in FIG. 12, the cladding is replaced with an annular array of holes (they could be air holes, or holes filled with a low-index glass) of diameter d. Each gap between the holes represents a "channel" through which the power in the core can leak out. The parameters of the LCF (specifically d and Λ) can be optimized to yield a much greater loss for higher-order modes than for the fundamental (lowest-order) mode. This mode-dependent loss can be exploited to allow the fundamental mode to dominate over all others. However, the LCF architecture suffers from the fact that the channels between the holes that allow mode discrimination also lead to significant losses of the fundamental mode (lowest-order mode) when the fiber is formed into a coil with a relatively small diameter. For example, in the LCF architecture, for 2p=100 µm (appropriate for a high-power fiber), the bend radius required to maintain an acceptable fundamental-mode loss less than 0.1 dB/m is 1.25 m (i.e., a full diameter of 2.5 m), thus making the LCF architecture not amenable to coiling in a small diameter package. A further drawback of the LCF architecture is that, as the core diameter is increased to accommodate higher powers, the path length from the core to the cooled fiber surface becomes longer, making thermal management a challenge. The thermal load manifests itself as a strong radial temperature gradient, which can result in thermally induced lensing and birefringence, and, in extreme cases, fracture.

None of the above conventional approaches addresses controlling modes in a semi-guiding amplifying medium or in a semi-guiding high aspect ratio core fiber laser.

SUMMARY

One embodiment of this disclosure provides a semi-guiding fiber apparatus comprising: a core having a high aspect ratio, elongated cross-section along a slow axis direction of the fiber, the core having a first refractive index; first and second signal claddings positioned in contact with and sandwiching the core, the first and second signal claddings having a second refractive index; and a third cladding substantially surrounding at least slow axis edges of the core, the third cladding having a third refractive index. The first refractive index of the core, the third refractive index of the third cladding, or the second refractive index of the first and second signal claddings, or two or more thereof, are selected so as to maximize a differential loss between a lowest order mode propagating in the optical fiber and next order modes so as to discriminate in favor of the lowest order mode and against the next order modes.

Another embodiment of this disclosure provides a method for mode control in a semi-guiding medium. The method includes providing a semi-guiding fiber apparatus comprising: a core having a high aspect ratio, elongated cross-section along a slow axis direction of the fiber, the core having a first refractive index; first and second signal claddings positioned in contact with and sandwiching the core, the first and second signal claddings having a second refractive index; and a third cladding substantially surrounding at least the slow axis edges of the core, the third cladding having a third refractive index; and controlling the first refractive index of the core, the second refractive index of the first and second signal claddings, or the third refractive index of the third cladding, or two or more thereof, to maximize a differential loss between a lowest order mode propagating in the optical fiber and next order modes so as to discriminate in favor of the lowest order mode and against the next order modes.

These and other features and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated herein are drawn to scale. It is to be expressly understood, however, that the drawings are for the purpose of illustration and description only and are not intended as a definition of the limits of the inventive concept. As used in the specification and in the claims, the singular form of "a", "an", and "the" include plural referents unless the context clearly dictates otherwise.

DETAILED DESCRIPTION

Figure 1:
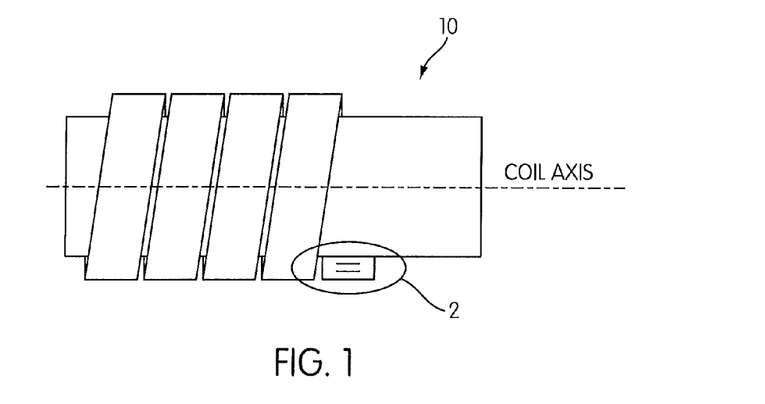
FIG. 1 is a schematic diagram of a fiber laser wound in a spiral coil around a carrier, according to an embodiment.
Figure 2:
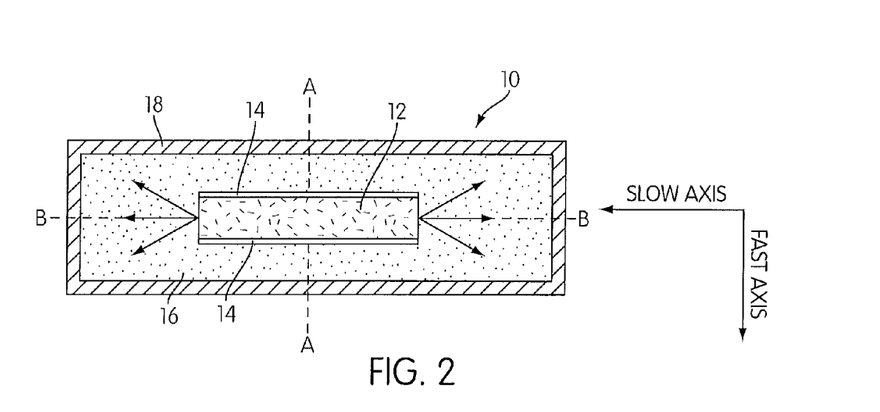
FIG. 2 is a schematic diagram of a cross-section of the fiber laser, according to an embodiment.

FIG. 1 is a schematic diagram of fiber laser 10 wound in a spiral coil around carrier 11, according to an embodiment of this disclosure. In this embodiment, fiber 10 has a semi-guiding high aspect ratio core (SHARC) architecture. A detailed description of the SHARC architecture can be found in co-pending U.S. patent application Ser. No. 11/891,328, filed on Aug. 9, 2007 and entitled "Method and Apparatus for Generation and Amplification of Light in a Semi-Guiding High Aspect Ratio Core Fiber," (now U.S. Pat. No. 7,983,312) which is incorporated herein by reference in its entirety. SHARC fiber laser 10 has a ribbon-like geometry which allows fiber laser 10 to be coiled in a spiral conformation around carrier 11, as shown in FIG. 1. Carrier 11 can include a cooling system or cooling structure for cooling fiber laser 10 during operation of fiber laser 10. FIG. 2 is a schematic diagram of a transverse cross-section of fiber laser 10, according to an embodiment of the present disclosure. Fiber laser 10 includes core 12, signal claddings 14, pump cladding or mode index matching (MIM) cladding 16 and coating 18. Core 12 is disposed or sandwiched between two signal claddings 14. Core 12 and signal claddings 14 are surrounded by pump cladding or MIM cladding 16. Coating 18 covers pump cladding 16. In one embodiment, coating 18 can be a polymer coating or any other flexible coating. SHARC fiber 10 has a rectangular cross-section, as shown in FIG. 2. In one embodiment, rectangular core 12 of SHARC fiber 10 has an aspect ratio that can lie between about 30:1 to 100:1 or more depending on laser power generation goal. The slow-axis and fast-axis are shown in FIG. 2. The slow-axis is in the direction of the larger dimension of the rectangular cross-section of fiber 10 and the fast axis is in the direction of the smaller dimension of the rectangular cross-section of fiber 10.

As shown in FIG. 2, core 12 and claddings 14 are centered within fiber 10 such that vertical axis AA divides fiber 10 into two substantially identical symmetrical halves and horizontal axis BB divides fiber 10 into two substantially identical symmetrical halves. However, as can be appreciated, core 12 and/or claddings 14 do not need to be centered within fiber 10. For example, in one embodiment, core 12 and claddings 14 can be offset from the axis of symmetry BB of fiber 10 (e.g., core 12 and cladding 14 can be positioned at the "top" or "bottom" in fiber 10 so as to be closer to the top or bottom portion of coating 18). Alternatively or in addition, core 12 and claddings 14 can be offset from axis of symmetry AA of fiber 10 (e.g., core 12 and cladding 14 can be positioned at a right side or a left side in fiber 10 so as to be closer to the right side or the left side portion of coating 18).

Core 12 comprises an active dopant material. The active dopant material can be distributed in the core 12 according to a desired transverse distribution profile in the core 12 of the fiber 10 to control the gain profile within the core. The active dopant material can be active dopant ions (active lasing dopant ions or active amplifying dopant ions) such as Ytterbium ions, Erbium ions, Thulium ions, or a combination of two or more of these ions.

The SHARC fiber 10 can be optimized to achieve highly effective mode control by optimizing the design parameters to exploit the mode dependence of the refractive loss through the narrow edges of the rectangular core, and/or by employing gain filtering to discriminate among a small number of viable transverse modes. For example, the number of modes can be kept small by designing the optical waveguide such that all higher-order transverse modes are lossy.

Prior to describing in detail mode-control methods according to various embodiments of the present disclosure, it may be worthwhile to consider a conventional high-aspect ratio rectangular guide employing index-based guiding on all four sides. In the high-aspect ratio rectangular guide, only the slow-axis modes in the wide dimension are considered since it can be assumed that diffraction in the slow-axis and fast-axis directions are de-coupled from each other, and that the bend-induced mode discrimination in the fast-axis direction is effective in discriminating against higher-order modes as may be the case in commercial LMA fibers.

Figure 3:
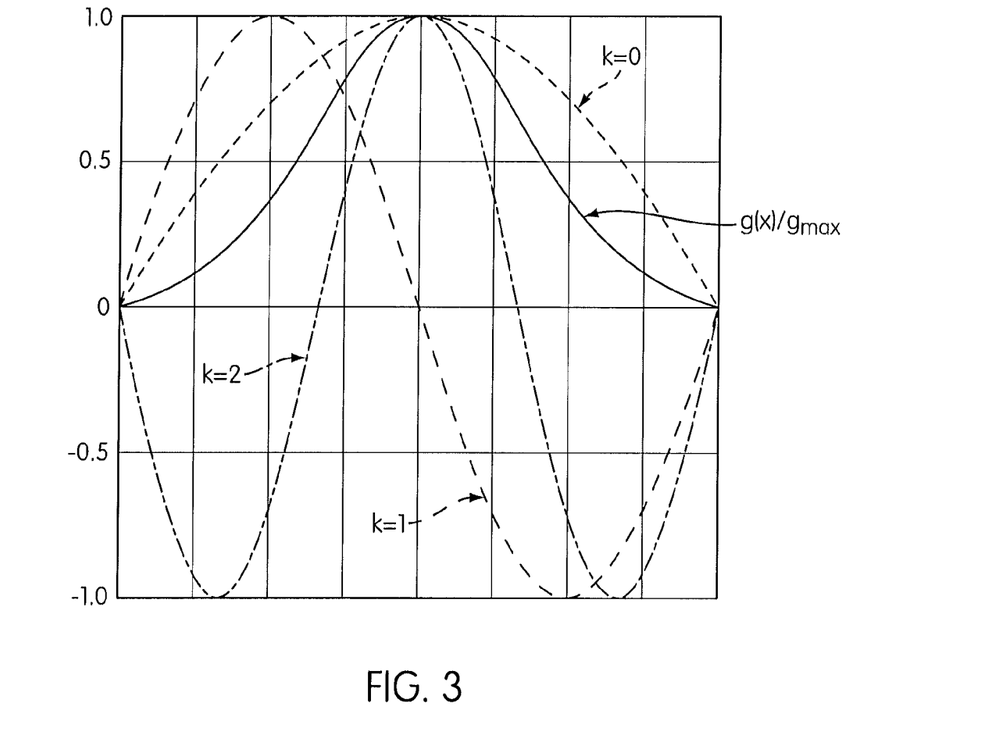
FIG. 3 is a plot of first three modes along a slow axis of an index-guided rectangular fiber guide and an ideal Gaussian-shaped gain profile, according to an embodiment.

FIG. 3 is a plot of the first three modes (k=0, k=1 and k=2) along the slow axis for an index-guided rectangular fiber guide having a width of about 1.5 mm and an ideal Gaussian-shaped gain profile ($g(x)/g_{max}$) that is produced by tailoring the spatial profile of the active lasing ions when the fiber is fabricated. Gain coefficient, $g(x)$, is in $cm^{-1}$, and $g_{max}$ is the gain for perfect overlap of a mode with the gain medium. In the absence of any gain, each of the three modes (k=0, k=1, and k=3) will propagate along the fiber with substantially no loss.

Figure 4:
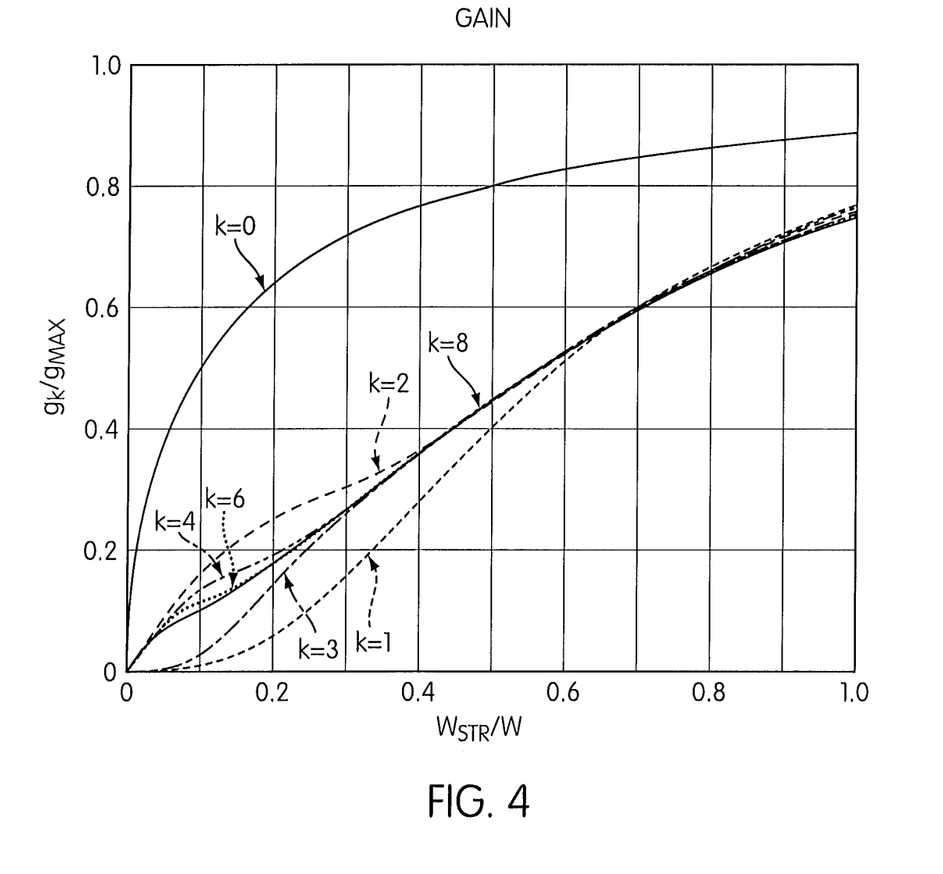
FIG. 4 is a plot of overlap integrals of lowest 7 modes in a rectangular guide having a Gaussian gain distribution shown in FIG. 3.

In the presence of a gain medium (i.e., lasing dopant ions), the effective gain of each mode is proportional to the spatial overlap of that mode with the gain profile medium (i.e., lasing dopant ions), for example the gain medium having a Gaussian gain profile, as shown in FIG. 2. FIG. 4 is a plot of overlap integrals of 7 lower-order modes (k=0, k=1, k=2, k=3, k=4, k=6, k=8) in a rectangular guide having a Gaussian gain distribution shown in FIG. 2 as a function of a ratio of the width ($w_{str}$) of the gain stripe to the full width (w) of the core. The ordinate axis represents the ratio of the gain coefficient $g_k$ (in $cm^{-1}$), of mode k to the maximum gain $g_{max}$ for perfect overlap. That is, the relative gain values are normalized to the maximum gain $g_{max}$ for a mode having full overlap (100%) with the gain medium distribution. The abscissa axis represents the ratio of the width ($w_{str}$) of the gain stripe to the full width (w) of the core.

As can be seen in FIG. 4, the lowest-order mode (k=0) has 2 to 3 times higher effective gain than any of the higher-order modes (k=1, k=2, k=3, k=4, k=6, and k=8). However, in the case of a fully index-guided core, gain filtering may not be sufficiently effective to force single-mode operation. Indeed, a guide having a width of about 1.5 mm can support about 80 to 100 transverse modes. If the saturated gain of the lowest-order mode is 100, for example, and if the width $w_{str}$ of the gain stripe is half the width w of the core, then according to FIG. 4, the other modes, i.e., higher modes k=1, k=2, k=3, etc., can have a log-gain that is about half that of the lowest-order mode, for a gain of $\sqrt{100}$=10. Hence, even though the higher-order modes only have a gain of 10, there are so many higher-order modes that the higher modes can extract more output power than the power extracted by the lowest-order mode, leading to poor beam quality.

The situation is quite different in the case of the SHARC design where the core edges in the wide dimension are open. Due to the fact that the core edges are essentially open in a SHARC fiber, any light propagating along the fiber will experience loss as it diffracts out through the open edges (in the wide dimension). The loss rate $\alpha_k$, of a mode k scales in proportion to $(k+1)^2$, where k=0, 1, 2, 3, . . . . Therefore, the loss increases rapidly with k, as shown in equation (1).

$$\alpha_k = (k+1)^2 \left(\frac{\lambda^2}{w^3 n_0}\right) \text{Im}[n_o^2 + (n_{cl} - ik)^2]^{-1/2} \qquad (1)$$

where $\lambda$ is the wavelength of the signal, w is the width of the core, $n_c$ is the refractive index of the core, $n_{cl}$+ik is the refractive index of the cladding which is a complex value that includes radiative loss in the cladding via an imaginary part k.

Figure 5A:
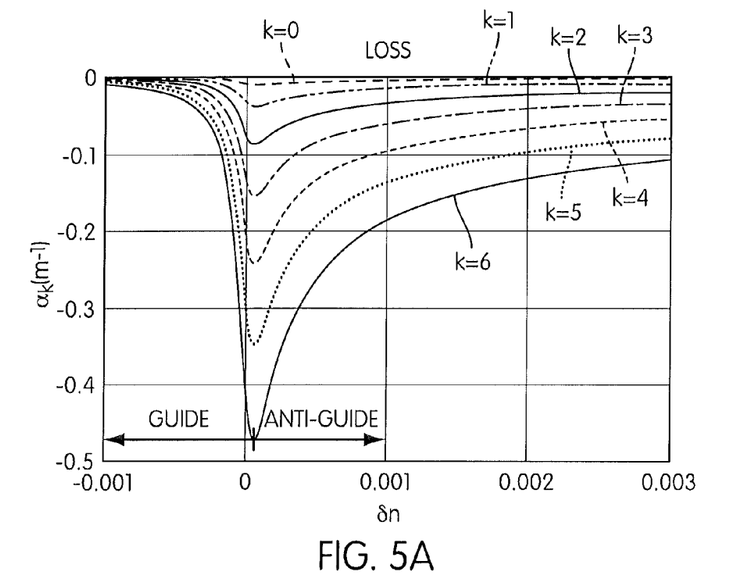
FIG. 5A shows plots of loss of the first seven modes as a function of the index step at the core-edge interface, according to an embodiment.

This situation is quantified in FIG. 5A which shows the plots of the loss $\alpha_k$ of the first seven modes (k=0, k=1, . . . , k=6) as a function of the index step $\delta n = n_{cl} - n_c$, at the core-edge interface. First, the plots in FIG. 5A confirm that the loss systematically increases for higher-order modes. Second, FIG. 5A shows that the mode propagation is lossy for a relatively broad range of values of $\delta n$. In addition, for $\delta n < 0$, i.e., when the outside refractive index is lower than the refractive index of the core ($n_{cl} < n_c$), the conditions of index guiding within the core are obtained. In this situation, total internal reflection arises at the core-edge interface and the transmission loss of all modes quickly drops to zero. On the other hand, for $\delta n > 0$, i.e., when the outside refractive index is greater than the refractive index of the core ($n_{cl} > n_c$), the anti-guiding condition is obtained. In this situation, the mode tails are drawn out of the core. However, the small grazing-incidence angle on the boundary with the non-zero index step can give rise to reflections at the core-edge interface. These reflections systematically reduce the propagation loss as $\delta n$ increases, but not as rapidly as in the case $\delta n < 0$.

For the conditions of interest, the loss for the lowest-order mode (k=0) is rather moderate, about 0.01 $m^{-1}$, which is negligible compared to a typical saturated gain rate of about 0.5 $m^{-1}$. In contrast, for the higher-order modes the propagation losses quickly increase with mode-order k to a level comparable to or greater than the gain, such that they remain in a state of net loss.

Figure 5B:
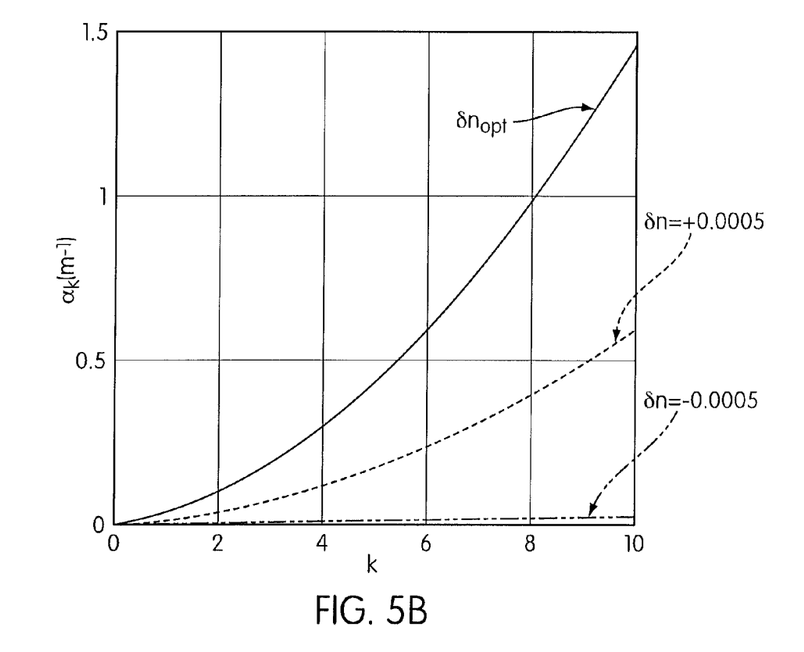
FIG. 5B shows plots of loss as a function of the mode order for three index steps, according to an embodiment.

FIG. 5B shows plots of loss $\alpha_k$ as a function of the mode order k for three index steps ($\delta n$ optimal, $\delta n$=0.0005, and $\delta n$=−0.0005), according to an embodiment. The plots shown in FIG. 5B are obtained from the same set of data used to obtain the plots shown in FIG. 5A. However, instead of plotting the loss $\alpha_k$ as a function of the index step $\delta n$ for various order modes k, as shown in FIG. 5A, the loss $\alpha_k$ is plotted as a function of the order mode k for various values of index step $\delta n$ ($\delta n$ optimal, $\delta n=0.0005$, and $\delta n=-0.0005$), in FIG. 5B. $\delta n$ optimal (in this example $\delta n$ optimal is equal to about 0.00009) corresponds to the index step were the maximum loss occurs (corresponding to the troughs in the plots shown in FIG. 5). The index step $\delta n$ equal to 0.0005 corresponds to the right vertical dotted line shown in FIG. 5A and the index step $\delta n$ equal to $-0.0005$ corresponds to the left vertical dotted line shown in FIG. 5A. As can be seen in FIG. 5B, the loss $\alpha_k$ increases more rapidly, as a function of the mode order k for the optimal index step $\delta n$, than the loss $\alpha_k$ for the index step $\delta n$ equal to 0.0005 or the loss $\alpha_k$ for the index step $\delta n$ equal to $-0.0005$. In other words, the loss varies more rapidly (i.e., has a steeper variation) as a function of mode order k for the optimal index step than for the index steps $\delta n$ equal to 0.0005 or $\delta n$ equal to $-0.0005$. In fact, as shown in FIG. 5B, the loss for the index step $\delta n$ equal to $-0.0005$ is almost constant (i.e., flat) and relatively small.

The steeper the variation of the loss as a function of the mode order, the greater the differential loss between the lowest order mode (k=0) and next order modes (k=1, k=2, k=3, ...). Therefore, by selecting an appropriate index step (i.e., by selecting an appropriate refractive index of the core, refractive index of the pump cladding, and/or refractive index of the signal claddings), the differential loss between a lowest order mode propagating in the optical fiber and next order modes can be maximized. By maximizing the differential loss between the lowest order mode and next order modes, the fiber can be optimized to discriminate in favor of the lowest order mode and against the next order modes.

Figure 6:
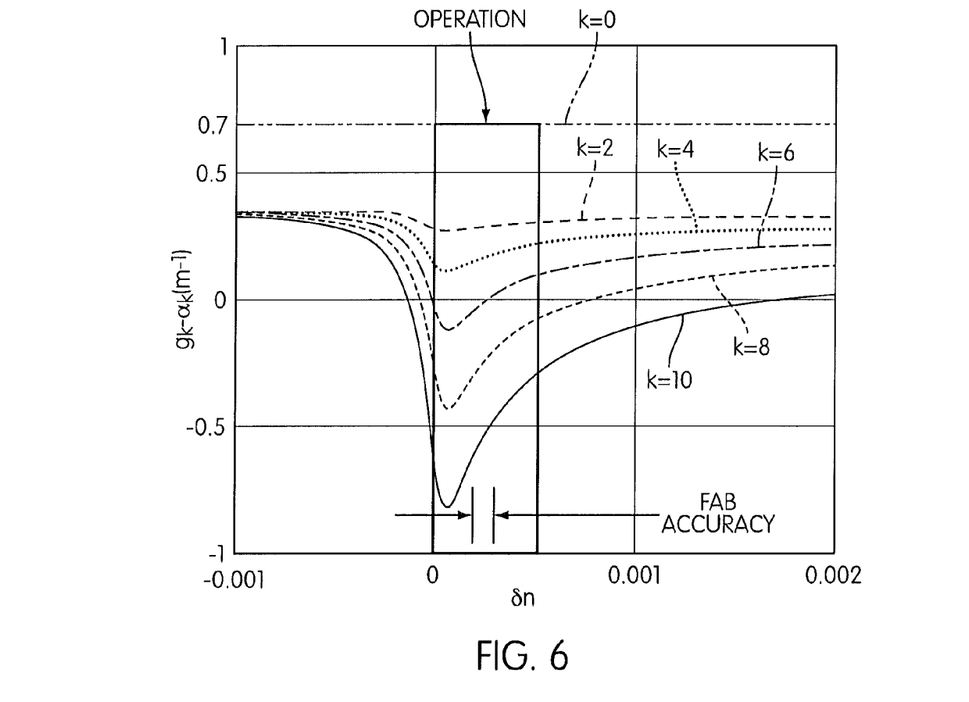
FIG. 6 shows plots of a net gain for various modes, according to an embodiment.

FIG. 6 is plot of a net gain, i.e., the difference between gain $g_k$ and loss $\alpha_k$, as a function $\sigma n$ for various modes (k=0, k=2, k=4, k=6, k=8 and k=10). FIG. 6 shows what happens when gain filtering is employed in a SHARC fiber when the pump-power level is adjusted to provide a net gain of $0.7$ m$^{-1}$ for the lowest-order mode (k=0). A net gain of $0.7$ m$^{-1}$ corresponds to a gain of approximately 50 for a 5.5 m fiber length. As can be seen in FIG. 6, in addition to the lowest-order mode (k=0), three other modes (k=2, k=4 and k=6) also have positive net gain, with the relative gain values depending on $\delta n$. In contrast to the earlier case of the fully index-guided rectangular core (as shown in FIG. 4), most of the SHARC fiber modes have net loss in the operation region (as shown in FIG. 6). In this example, only four modes (k=0, k=2, k=4 and k=6) have net gain. With only few higher order modes viable in the SHARC fiber, gain filtering can be used for discriminating in favor of the desired lower-order modes. Moreover, the discrimination for the lower-order modes can be achieved over a range of values for the index step $\delta n$ and for an index step of at least about $5 \times 10^{-4}$ (e.g., the refractive index of the core is less than the refractive index of the pump cladding by at least about $5 \times 10^{-4}$).

Fibers with index-step control at a level of at least $10^{-4}$ can currently be fabricated. The fabrication accuracy is indicated in FIG. 6. One parameter applicable to mode discrimination is to optimize the index step at the edges of the core to provide a desired design margin.

In order to demonstrate that the principles outlined above are valid, mode propagation simulations or calculations may be performed. In one embodiment, 2-D calculations are performed. In the 2-D calculations, one spatial dimension is defined as the propagation direction and the other dimension as the transverse direction (slow-axis direction). In one embodiment, the fiber is assumed to have a Gaussian-shaped Yb dopant profile that filled approximately half of the core width. The full quasi-four-level Yb laser dynamics are included in the calculation, along with the gain saturation. In addition, the waveguide geometry including the bi-directional pumping is taken into account in the calculation.

In one simulation, a single mode is launched on one end of the fiber and the single mode is allowed to propagate the length of the fiber. The output at the opposite end of the fiber is calculated and found to be substantially identical to the launched single mode. In another simulation, a white spatial noise is launched into the fiber, under identical conditions. The output at the opposite end of the fiber is also calculated. Similar to the previous simulation, the fiber again yields a single-mode output profile, indicating that the fiber successfully discriminates against all higher-order modes. This result shows that the SHARC core is single-mode in the slow-axis direction.

Figure 7:
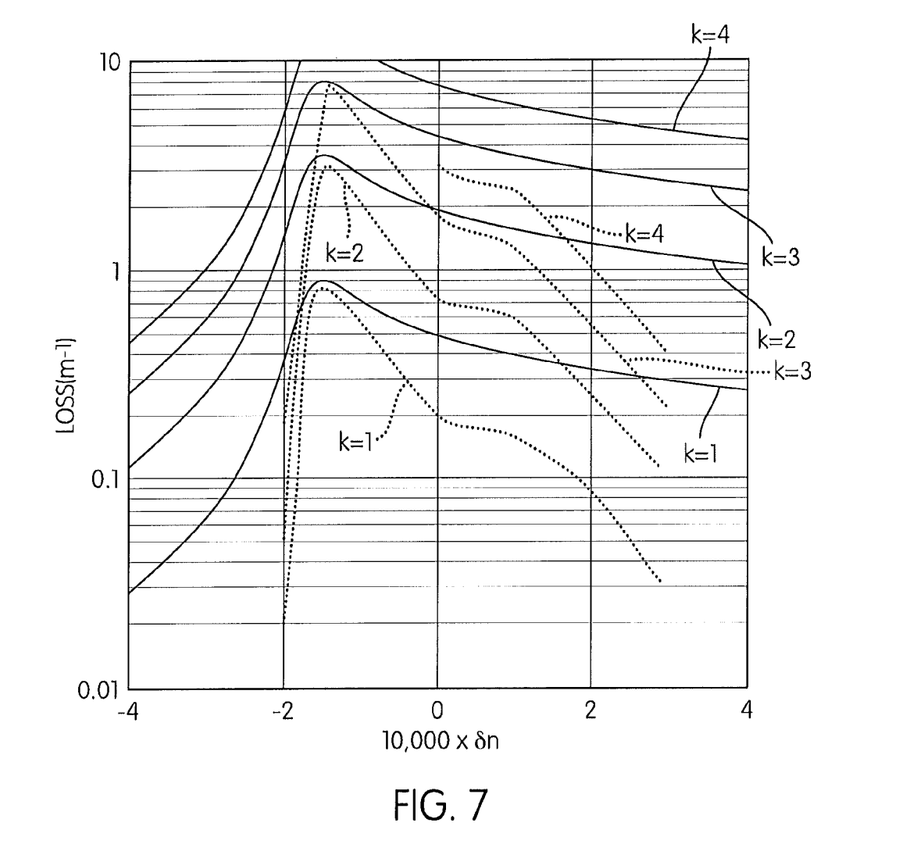
FIG. 7 depicts a series of plots showing the dependence of propagation losses on the index step for various modes, according to an embodiment.

A subsequent set of more rigorous simulations are also performed. This set of simulations indicate that the optimum value of $\delta n$ is slightly negative. FIG. 7 depicts a series of plots showing the dependence of propagation losses on $\sigma n$ for various modes (k=1, k=2, k=3, k=4), according to one embodiment. The solid-line curves correspond to analytic calculations and the dotted-line curves correspond to a more accurate 3-D propagation simulation. The solid-line curves are equivalent to the curves in FIG. 5A, except that the curves are moved to the left to overlap with the dotted curves generated by the 3-D propagation simulation. In FIG. 7, however, loss increases in the upward direction, whereas in FIG. 5A, loss increases in the downward direction.

Figure 8:
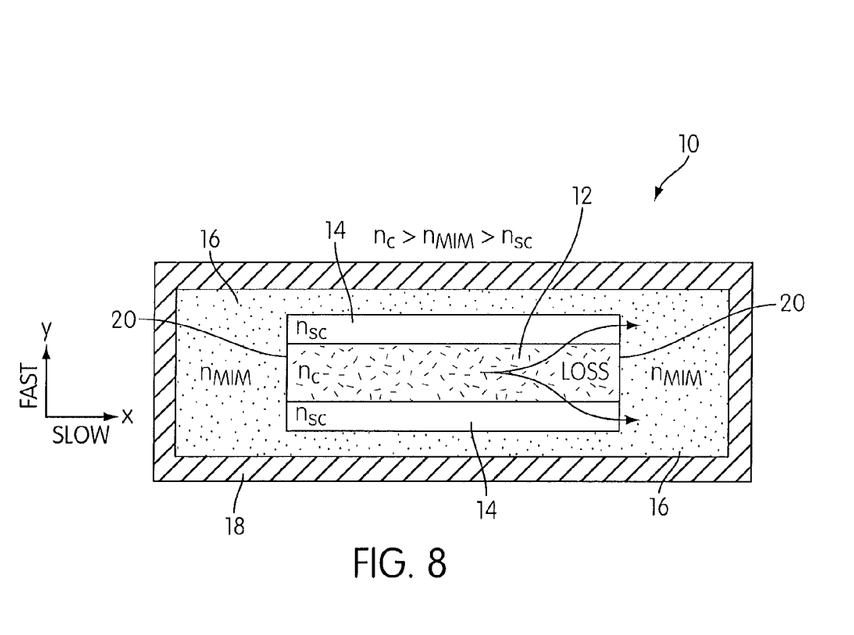
FIG. 8 depicts schematically a transverse cross-section of the SHARC fiber shown in FIG. 2 showing a loss path, according to an embodiment.

The reason that the index step $\delta n$ for maximum loss has moved into the "guiding" regime where $\delta n$ is negative can be understood by considering FIG. 8. FIG. 8 schematically depicts a transverse cross-section of the SHARC fiber 10 showing a loss path according to an embodiment. In this embodiment, the refractive index $n_{MIM}$ of the mode-index matching (MIM) or the pump cladding 16 is lower than the refractive index $n_c$ of the core 12 ($n_{MIM} < n_c$) but higher than the refractive index $n_{sc}$ of the signal claddings 14 ($n_{MIM} > n_{sc}$). Even though the mode-index matching (MIM) medium or the pump cladding 16 outside core edges 20 has a refractive index $n_{MIM}$ lower than the refractive index $n_c$ of the core 12 (so as to produce total internal reflection at the boundary between the core 12 and the MIM cladding 16), the MIM cladding or pump cladding 16, however, has a higher index than the refractive index $n_{sc}$ of the signal claddings 14. As a result, the MIM cladding 16 is anti-guiding relative to the signal claddings 14. Consequently, the tails of the core modes that penetrate into the signal claddings 14 are drawn out into the MIM cladding 16 outside the core (as depicted schematically by the double arrows in FIG. 8). As a result, the loss is increased and the point of maximum loss is moved to negative index step $\delta n$ as shown in FIG. 7 relative to the position estimated in the analytical modeling provided earlier.

In one embodiment, the mode-loss filtering described above occurs along the slow-axis direction, while mode-loss in the fast-axis direction can be implemented by coiling the fiber into a relatively small diameter coil to obtain a compact package (as shown in FIG. 1). Hence, in one embodiment, a mode loss along a fast axis direction of the fiber is decoupled from a mode loss along the slow axis of the fiber. Consequently, mode-loss filtering, according to the embodiment described above, is free from the limitations associated with the LCF architecture depicted in FIG. 12 and discussed above. For example, the slow-axis design can be optimized for best mode discrimination without affecting the diameter of the fiber coil in the fast-axis direction. Thus, packaging flexibility can be achieved while the fiber can be optimized for single-mode operation in the slow-axis direction.

As discussed above, mode discrimination is achieved using mode-loss filtering. However, as it can be appreciated, mode discrimination can also be achieved using gain filtering in addition to mode-loss filtering.

It must be appreciated that "mode-loss filtering" and "gain filtering" discussed herein are fundamentally different from gain guiding. Gain guiding is a phenomenon that relies upon the fact that when gain exists within a medium, that gain actually modifies the local refractive index of the medium. This modification or change of the refractive index due to a mode interacting with the medium is weak, but non-zero. Under conditions of sufficient gain over a sufficiently narrow channel, the gain-induced index change can be large enough to form a weak guiding channel, and this can actually guide an optical signal. A description of "gain guiding" can be found in U.S. patent application Ser. No. 11/891,328, filed on Aug. 9, 2007 and entitled "Method and Apparatus for Generation and Amplification of Light in a Semi-Guiding High Aspect Ratio Core Fiber," (now U.S. Pat. No. 7,983,312) the entire contents of which are incorporated herein by reference.

Gain filtering differs from gain guiding in that any local index change induced by the gain is weak compared with other index patterns built into the medium, for example by appropriate doping of the medium with Al, Ge, or other dopants. Hence, the dominant effect of the gain in such a situation is amplifying the signal as opposed to guiding the signal, and the mode profiles remain essentially the same as without the gain.

Furthermore, it is worth noting that "mode-loss filtering" does not require any gain whatsoever to be effective as a method for mode discrimination or mode control. One way to achieve "mode-loss filtering" is to study the medium and identify a judicious set of design parameters (dimensions, index profiles, etc.) for which the propagation loss is highly dependent on the mode number.

In another embodiment, to achieve mode discrimination or mode control, a numerical aperture (NA) of the optical waveguide can be systematically varied in the slow-axis direction. For example, the NA can be shaped as a Gaussian-like profile with the maximum value of the Gaussian-like profile positioned on the fiber longitudinal axis. Shaping the NA profile as a Gaussian-like profile with a maximum of Gaussian-like profile lying on the fiber longitudinal axis can result in a monotonic increase of a leakage rate of signal power out of the core with increasing distance from the core axis. One of the benefits of this approach is the ability to obtain zero mode amplitude at the core edges. As a result, this may relax fabrication tolerances by increasing the degree to which index steps at the core edges can be tolerated without affecting the mode quality of the signal beam.

Figure 9A:
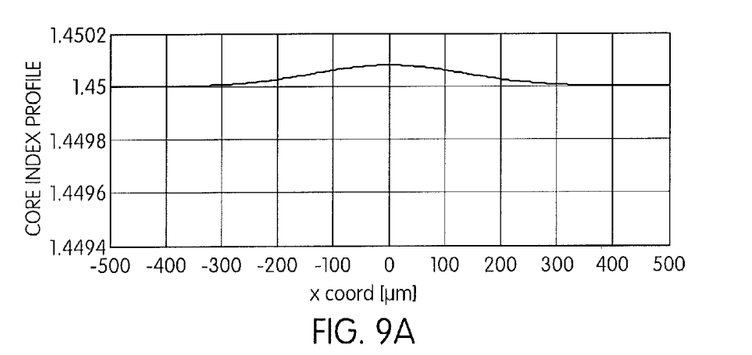
FIG. 9A depicts the refractive index profile of the core as a function of a distance in the slow axis direction, according to an embodiment.
Figure 9B:
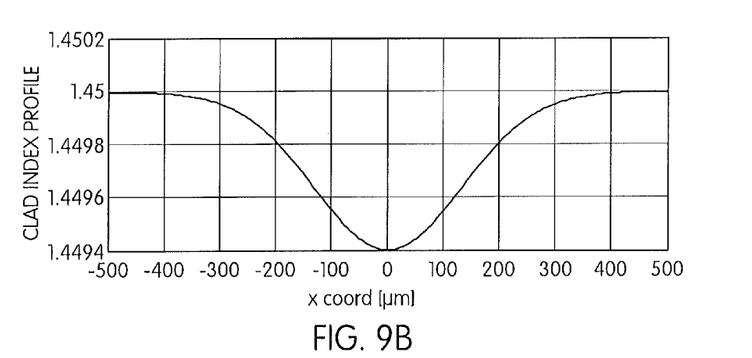
FIG. 9B depicts the refractive index profile of the signal cladding as a function of the distance in the slow axis direction, according to an embodiment.
Figure 9C:
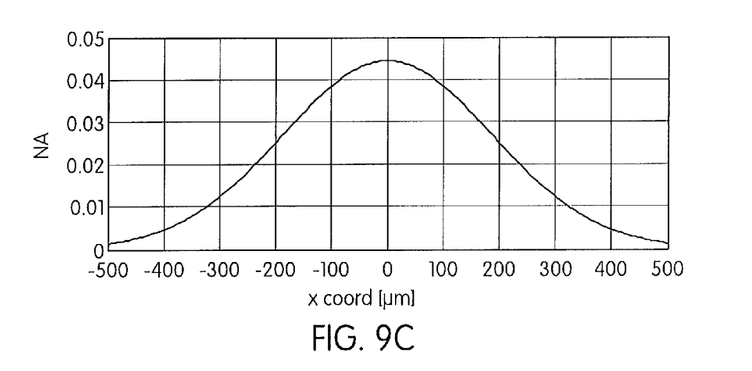
FIG. 9C depicts a spatial variation of a Numerical Aperture as a function of a distance in the slow axis direction, according to an embodiment.

FIG. 9A depicts the refractive index profile of the core as a function of a distance in the slow axis direction, according to an embodiment. FIG. 9B depicts the refractive index of the signal cladding as a function of the distance in the slow axis direction, according to an embodiment. FIG. 9C depicts a spatial variation of the Numerical Aperture as a function of a distance in the slow axis direction, according to an embodiment. In this embodiment, the full core width is approximately 1 mm, and the width of the Gaussian-like profiles is approximately 530 μm (full width measured at Gaussian amplitude $e^{-2}$). As shown in FIG. 9A, the core refractive index changes relative to a refractive index baseline of 1.45. As shown in FIG. 9B, the signal claddings refractive index is anti-Gaussian-like from a baseline index value of about 1.45. The maximum refractive index in the core is $0.8\times10^{-4}$ relative to the baseline refractive index and the minimum refractive index in the claddings relative to the baseline value of about 1.45 is $-6\times10^{-4}$. The maximum of the numerical aperture profile is about 0.045.

Figure 10A:
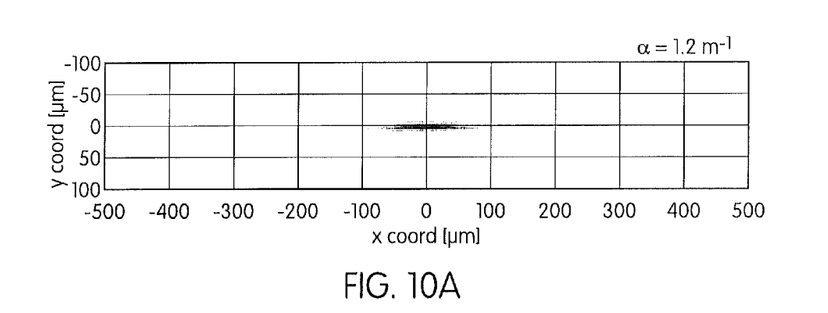
FIGS. 10A, 10B and 10C depict spatial profiles of the first three modes produced by the core with the numerical aperture profile shown in FIG. 9C.
Figure 10B:
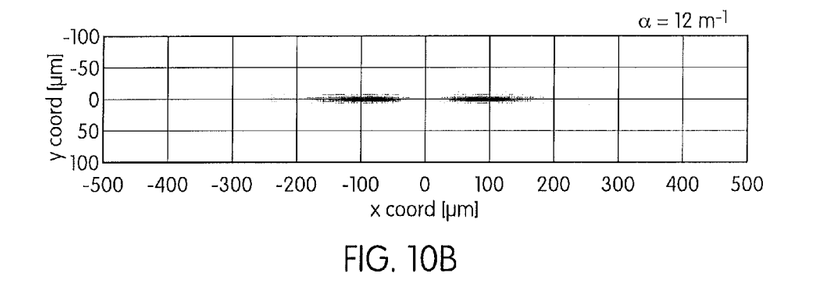
Figure 10C:
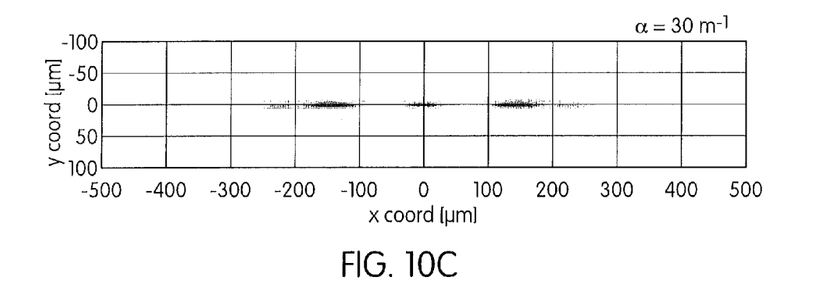

Using the guiding structure or fiber with the above refractive indices and the resulting numerical aperture, a simulation is performed to determine the type of modes present in this guiding structure as well as the mode spatial distributions in the fiber. FIGS. 10A, 10B and 10C depict spatial profiles of the first three modes produced by the core with the numerical aperture profile shown in FIG. 9C. Also shown for each mode is the linear loss coefficient α. The x-coordinate represents the dimension of the core along the slow-axis direction and the y-coordinate represents the dimension of the core along the fast-axis direction. As shown in FIGS. 10A and 10B, the loss differential between the fundamental (shown in FIG. 10A) and first-order mode (shown in FIG. 10B) is a factor of 10. In other words, the loss rate of the first-order mode is about 10 times higher than the loss of the fundamental mode. Furthermore, as shown in FIG. 10C, the second-order mode has a loss rate that is 25 times greater than that of the fundamental mode (shown in FIG. 10A). Hence, the level of loss differential between the fundamental mode and the second-order mode is significant which indicates that this approach can effectively discriminate in favor of the lowest-order mode (fundamental mode).

In one embodiment, instead of assuming a relatively homogeneous fiber medium, index variations or fluctuations that may appear in the core of the fiber are taken into account in a calculation or simulation to evaluate whether the discrimination properties of the core can withstand in a core environment where there are index fluctuations. Index fluctuations in the core can originate from doping clusters, residual stress, core thickness variation, etc. In one embodiment, the magnitude of the inhomogeneities is characterized by the root mean square (RMS) amplitude variation $\Delta n_{rms}$ that occurs over a spatial scale of about 1 mm that approximately corresponds to the core width. In one embodiment, for a core width of 1.5 mm, if fluctuations of the index are below about $2\times10^{-6}$ (about 2 ppm), the quality of the beam output after a propagation in a 4m fiber length remains nearly diffraction limited. However, if the index variations exceed a threshold of about 3 to about 6 ppm, the beam quality and efficiency can suffer due to interference between competing modes. As a result, strong near-field intensity modulations can arise. The interference can reduce the overlap of the mode spatial profile with the gain stripe, and hence the extraction efficiency can suffer. For single-mode operation, the mode over-fills the active region (e.g., core), thus maximizing extraction.

In one embodiment, the susceptibility of the fiber to index non-uniformities, i.e., index fluctuations, can be reduced by providing a parabolic index profile in the core of the fiber along a slow axis direction of the fiber. If the slow-axis index profile inside the core is slightly parabolic, the modes become increasingly immune to index fluctuations. A parabolic index profile along the slow axis direction (x-direction) can be expressed by equation (2):

$$\Delta n(x) = \langle n \rangle + \Delta n(0)\left(1 - \frac{4x^2}{w^2}\right) \tag{2}$$

Where x is the dimension of the core along the x-direction (slow axis direction), w is the width of the fiber core, $\langle n \rangle$ is the average value of the index in the core, and $\Delta n(0)$ is the variation of the parabolic index at the center of the core.

When the index parabola maximum Δn(0) is greater than Δn$_{rms}$, a good beam quality and a higher amplifier efficiency can be achieved.

The parabolic index profile changes the basis set for the slow axis modes from harmonic functions to Hermite-Gaussian functions. The lowest-order Hermite-Gaussian mode for the parabolic profile is concentrated near the center of the core, thus providing a good spatial overlap with the gain stripe. In addition, the parabolic index profile in the core can also effectively isolate the lowest-order mode from the core edges. Indeed, with the parabolic index profile in the core, the lowest-order mode suffers lower edge loss as compared to a flat profile index in the core. Furthermore, if the parabola maximum Δn(0) is not excessive, the higher-order modes can be delocalized. Consequently, the higher-order modes may have a worse overlap with the gain stripe and may also contact the edges of the core. As a result, the higher-order modes may suffer greater loss than the lowest-order mode.

In one embodiment, in order to reduce potential higher-mode overlap with the gain strip along with the lowest-order mode, the index parabolic refractive index height maximum Δn(0) is set not to exceed 6 ppm. Indeed, if the maximum height of the parabolic refractive index profile is higher than 6ppm, the next higher order mode may overlap the gain stripe almost as well as the lowest-order mode and the next higher order mode may also become isolated from the edges of the core. As a result, the discrimination rate between the two modes (lowest-order mode and higher mode) may become weak. Hence, the core may guide both modes (the lowest-order mode and the next higher-order mode). When setting the limit of Δn(0) equal to about 6 ppm, the tolerance to index fluctuations increases by about a factor of two to Δn$_{rms}$ of about 5 to 6 ppm relative to the constant index case.

In one embodiment, tolerance to index inhomogeneities can be further increased by making the gain stripe narrower than the core width. In this case, the gain ratio in favor of the lower modes for the range w$_{str}$/w<2 can be increased from 2 to 3 (as shown in FIG. 4). However, such condition may also reduce the effective gain for the lowest mode. In principle, it may be possible to restore the gain value by increasing the concentration of active dopant ions (e.g., Yb ions). However, care should be taken to avoid formation of clusters in the active dopant ions which can be done, for example, by adding a passive dopant such as aluminum into the core. Another way to compensate for the reduced effective gain is by making the fiber longer. Additional design degrees of freedom can be implemented to improve the effective gain while improving the tolerance to index homogeneities.

In one embodiment, mode control can be achieved even in the presence of relatively strong but slowly varying transverse index gradients. Indeed, if transverse index gradients are sufficiently strong, the index gradients can affect the structure, gain, and loss of the modes and thus affect the mode-control efficiency. The gradients can be "built-in," originating from stress and/or originating from core-thickness modulation (which may arise from imperfect manufacturing). In addition, transverse temperature gradients can cause refractive-index gradients. Temperature gradients are dynamic in nature and they appear due to the fact that pumping and lasing are dependent on operational conditions as well as dopant concentration in the fiber.

While a weakly focusing parabolic index profile can help to increase the mode resistance to higher order small scale index perturbations, the benefit in mode clean-up or mode discrimination may diminish if the index profile deviates from the optimum (i.e., either too strong or too weak). In one embodiment, it is estimated that the optimal amplitude of the parabola shaped index profile is relatively small as compared to demonstrated level of index-control achievable with current manufacturing processes. However, this limitation can be circumvented by adding a dynamic variable refractive index component to the transverse index profile. The dynamic variable refractive index component can be fine-tuned to compensate for potential manufacturing errors that may exist. In one embodiment, the variable index profile control can be obtained using various methods (for example, by applying heat near the slow-axis edges or by cooling the fiber to control the slow-axis thermal gradient) disclosed in a related co-pending application entitled "Optical Device and Method of Controlling a Refractive Index Profile in the Optical Device," with attorney docket no. 073522-0375641, (now U.S. Pat. No. 8,014,426) the entire contents of which are incorporated herein by reference.

Figure 11:
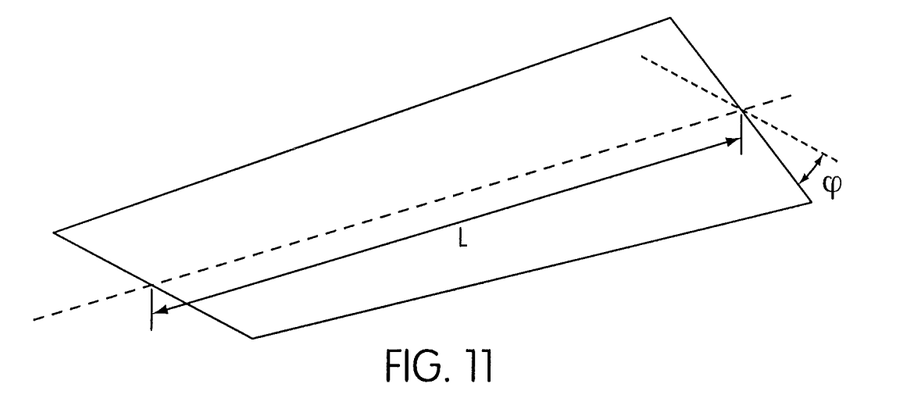
FIG. 11 depicts schematically a twisting configuration of the fiber for controlling a refractive index of the fiber, according to an embodiment.

In another embodiment, in order to control or tune either the built-in refractive index profile or the heat induced index profile to optimize slow-axis mode control, at least a portion of the fiber is twisted to achieve a defocusing effect of the planar propagating signal. By twisting at least a portion of the fiber, as depicted in FIG. 11, the optical path lengths for optical rays near the edges of the SHARC fiber core become longer than the path along the axis. The geometrical path-length difference grows as the square of the lateral distance of the ray trajectory from the axis. The twist induces an effective lens that is negative regardless of the twist direction (i.e., clockwise or counterclockwise) since the axial path is shorter in either case. After propagating through a determined distance in the twisted region, the mode accumulates a phase-modulation mask equivalent to a mask provided by a negative planar lens. The effective focal length F of the twist induce negative lens can be estimated in a geometrical approximation by equation (3).

$$F = \frac{L}{\varphi^2} \quad (3)$$

where L is the length of the twisted portion of the fiber and φ is the twist angle over this length L.

Twisting the fiber may induce strains within the core of the fiber which can change the local refractive index, i.e., the refractive index of the core, the refractive index of the cladding and/or the refractive index of the MIM. The strains can modify equation (3). In practice, the mode control can be tuned empirically by varying the local fiber twists until a twist position that provides the desired or optimum beam quality for a given pump power is reached.

The above description has been provided for the purpose of illustration based on what are currently considered to be the most practical implementations, it is to be understood that such detail is solely for that purpose, and that the inventive concept is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Furthermore, since numerous modifications and changes will readily occur to those with skill in the art, it is not desired to limit the inventive concept to the exact construction and operation described herein. Accordingly, all suitable modifications and equivalents should be considered as falling within the spirit and scope of the inventive concept.

What is claimed is:

1. A semi-guiding optical fiber, comprising:
a core having a high aspect ratio including first and second wide surface interfaces, and first and second narrow edge interfaces, the core having a slow axis parallel to the first and second wide surface interfaces, and a refractive index; and
first and second signal claddings positioned in contact with the first and second wide surfaces of the core, respectively, the first and second signal claddings having a spatial refractive index profile having a minimum value at a longitudinal axis of the core, a maximum value substantially equal to the refractive index of the core at the first and second narrow edge interfaces of the core, and intermediate values gradually increasing from the minimum value to the maximum value as distance from the longitudinal axis increases along the slow axis of the fiber.

2. The optical fiber of claim 1 wherein the spatial refractive index profile of the first and second signal claddings is an anti-Gaussian-like profile.

3. The optical fiber of claim 2 wherein the refractive index profile of the core has a parabolic refractive index profile along the slow axis direction of the fiber.

4. The optical fiber of claim 1 further comprising a third cladding substantially surrounding at least the first and second narrow edge interfaces of the core.

5. The optical fiber of claim 3 wherein a refractive index of the third cladding is substantially the same as the refractive index of the core near said narrow core interfaces.

6. The optical fiber of claim 3 wherein a refractive index of the third cladding is greater than the refractive index of the core.

7. The optical fiber of claim 3 wherein the refractive index of the core has a spatial refractive index profile having a maximum value at the longitudinal axis of the core, a minimum value substantially equal to the refractive index of the third cladding at the first and second narrow edge interfaces of the core, and intermediate values decreasing gradually from the maximum value to the minimum value as distance from the longitudinal axis increases along the slow axis of the fiber.

8. The optical fiber of claim 1 wherein the refractive index of the core has a Gaussian-like profile along the slow axis direction of the fiber.

9. The optical fiber of claim 1 wherein the refractive index profile of the core has a parabolic refractive index profile along the slow axis direction of the fiber.

10. The optical fiber of claim 6 wherein the difference between the maximum value and minimum value of the spatial refractive index profile of the core is less than about $6\times10^{-6}$.

11. The optical fiber of claim 1 wherein the core is substantially rectangular in shape.

12. The optical fiber of claim 3 wherein the index profile in the first and second cladding is created by photonic crystal techniques.

13. A method for mode control in a semi-guiding medium, the method comprising:
providing a semi-guiding fiber comprising a core having a high aspect ratio including first and second wide surface interfaces, and first and second narrow edge interfaces, the core having a slow axis parallel to the first and second wide-surface interfaces, and a refractive index, and first and second signal claddings positioned in contact with the first and second wide surfaces of the core, respectively, the first and second signal claddings having a spatial refractive index profile having a minimum value at a longitudinal axis of the core, a maximum value substantially equal to the refractive index of the core at the first and second narrow edge interfaces of the core, and intermediate values gradually increasing from the minimum value to the maximum value as distance from the longitudinal axis increases along the slow axis of the fiber.

14. The method of the claim 13 wherein the refractive index of the core has a spatial refractive index profile having a maximum value at the longitudinal axis of the core, a minimum value substantially equal to the refractive index of the third cladding at the first and second narrow edge interfaces of the core, and intermediate values decreasing gradually from the maximum value to the minimum value as distance from the longitudinal axis increases along the slow axis of the fiber.

* * * * *